United States Patent [19]

Ishii et al.

[11] Patent Number: 5,158,689
[45] Date of Patent: Oct. 27, 1992

[54] METHOD FOR PURIFICATION OF WASTE WATER

[75] Inventors: Tooru Ishii, Himeji; Kiichiro Mitsui, Akashi; Kunio Sano, Ako; Akira Inoue, Hirakata; Hideki Sogabe, Himeji, all of Japan

[73] Assignee: Nippon Shokubai Kagaku Kogyo Co., Ltd., Osaka, Japan

[21] Appl. No.: 586,396

[22] Filed: Sep. 20, 1990

Related U.S. Application Data

[63] Continuation of Ser. No. 362,583, Jun. 7, 1989, abandoned.

[30] Foreign Application Priority Data

| Jun. 7, 1988 | [JP] | Japan | 63-138556 |
| Jul. 8, 1988 | [JP] | Japan | 63-168811 |
| Nov. 7, 1988 | [JP] | Japan | 63-279501 |

[51] Int. Cl.$^5$ .................... C02F 1/72; C02F 11/08
[52] U.S. Cl. .................................................. 210/762
[58] Field of Search .............................. 210/761, 762

[56] References Cited

U.S. PATENT DOCUMENTS

| 3,907,678 | 9/1975 | Pradt et al. | 210/761 |
| 4,139,461 | 2/1979 | Bauer | 210/761 |
| 4,141,828 | 2/1979 | Okada et al. | 210/762 |
| 4,141,829 | 2/1979 | Thiel et al. | 210/762 |
| 4,155,848 | 5/1979 | Sato et al. | 210/761 |
| 4,229,296 | 10/1980 | Wheaton | 210/758 |
| 4,604,215 | 8/1986 | McCorquodale | 210/762 |
| 4,751,005 | 6/1988 | Mitsui | 210/762 |
| 4,861,497 | 8/1989 | Welch et al. | 210/762 |
| 4,869,933 | 9/1989 | Binning et al. | 210/761 |

FOREIGN PATENT DOCUMENTS

| 0085961 | 8/1983 | European Pat. Off. |
| 0135144 | 3/1985 | European Pat. Off. |
| 0267338 | 5/1988 | European Pat. Off. |
| 52-15065 | 4/1977 | Japan |
| 52-15066 | 4/1977 | Japan |
| 58-64188 | 4/1983 | Japan |
| 59-19757 | 5/1984 | Japan |

*Primary Examiner*—Thomas Wyse
*Attorney, Agent, or Firm*—Burns, Doane, Swecker & Mathis

[57] ABSTRACT

A method for the purification of waste water by the use of a heat-exchanger type reaction vessel composed of a plurality of inner tubes and a shell defining jointly with the outer peripheries of the inner tubes a passage for the flow of a heat transfer medium, which method comprises passing said waste water through said inner tubes and, at the same time, feeding a molecular oxygen-containing gas to the flow of said waste water thereby establishing contact between said waste water and said feed gas and consequently effecting wet oxidation of the impurities present in said waste water.

12 Claims, 3 Drawing Sheets

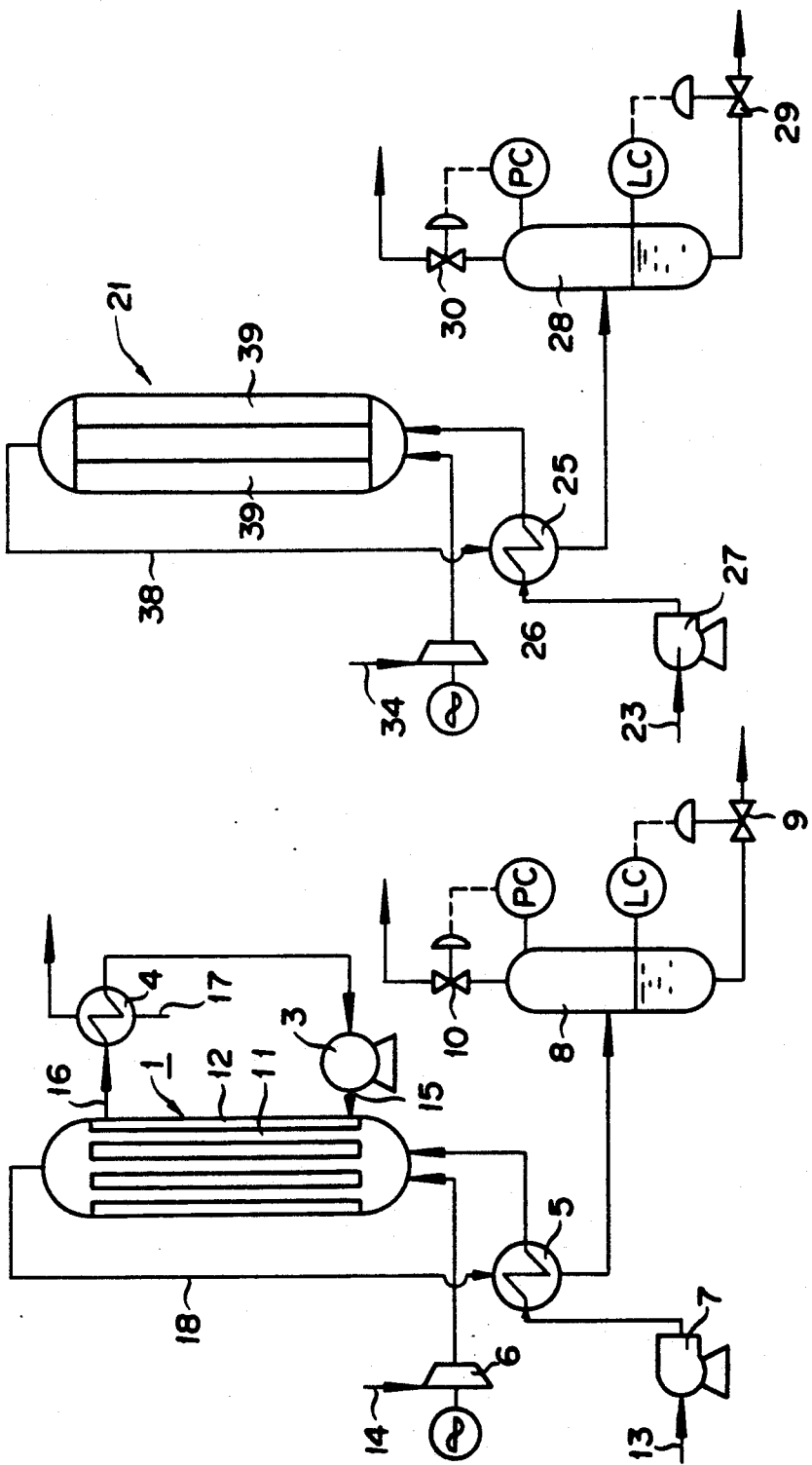

METHOD FOR PURIFICATION OF WASTE WATER

This application is a continuation of application Ser. No. 362,583, filed Jun. 7, 1989, abandoned.

BACKGROUND OF THE INVENTION

1. Field of the Invention

This invention relates to a method for the purification of waste water. Particularly, this invention relates to a method for the purification of waste water containing chemical oxygen-demanding substances (hereinafter referred to as "COD component") by wet oxidation. More particularly, this invention relates to a method for effective purification of waste water containing a COD component, i.e. harmful oxidizable organic or inorganic substances (herein after referred to "impurity"), which method effects the purification of the waste water by subjecting the waste water to wet oxidation in the presence of molecular oxygen thereby converting the organic substances into harmless compounds such as carbon dioxide, water, and nitrogen.

2. Description of the Prior Art

Among the methods currently available for the treatment of waste water, the biochemical method called the activated sludge method and the wet oxidation method called the Zimmermann method have been renowned.

For the wet oxidation method, use of a varying oxidizing catalyst for the purpose of heightening the reaction rate has been proposed. Further, for the wet oxidation method, no matter whether a catalyst is absent from or present in the reaction site, the single cylinder type reaction column is used as the reaction vessel.

The activated sludge method consumes a long time for the decomposition of organic substances and requires the waste water to be diluted to a concentration fit for the growth of algae and bacteria and, therefore, has the disadvantage that the facilities for the treatment of activated sludge occupy a large floor space. Further, in recent years, the handling of the surplus grown sludge has been entailing an immense expenditure particularly in urban districts. The Zimmermann method comprises oxidatively decomposing organic substances in an aqueous solution by introducing air into the aqueous solution of the organic substances under a pressure in the range of 20 to 200 atmospheres at a temperature in the range of 200° to 370° C. Since the reaction rate is low and the decomposition consumes a long time, this method necessitates a large reaction vessel made of a highly durable material and attains no real economy because of expensive equipment and expensive operation. Since the liquid phase within the reaction vessel cannot be retained when the reaction temperature is elevated by the heat of reaction, this method has the disadvantage of being incapable of effectively treating waste water whose COD component has a high calorific value. Also for this method, use of a varying oxidizing catalyst for the purpose of heightening the reaction rate has been proposed. For the use of such an oxidizing catalyst, none of the conventional methods for waste water treatment is specifically devised to relieve the reaction vessel of the heat of reaction.

Particularly in the treatment of highly concentrated by the conventional wet oxidation method, the amount of the heat generated by the reaction is conspicuously large. Since the liquid phase within the reaction vessel cannot be retained when the temperature thereof is elevated in consequence of the increase in the heat of reaction, it becomes necessary to curb the amount of generated heat by diluting the waste water under treatment. The dilution has as a problem the liability to increase the amount of waste water to be treated. Even where the waste water has a low COD content and the amount of the heat generated by the reaction is small, the heat generated still goes to elevating the liquid temperature and inevitably requires the reaction pressure to be unduly increased for the purpose of keeping the waste water in a liquid state. Thus, the treatment involving the use of an oxidizing catalyst attains no real economy because of an addition to the expense of equipment and that of operation.

An object of this invention, therefore, is to provide an improved method for the purification of waste water.

Another object of this invention is to provide method capable of effective purification of waste water containing a COD component, i.e. harmful organic or inorganic substances, by subjecting the waste water to wet oxidation in the presence of molecular oxygen thereby converting the harmful substances into such harmless compounds as carbon dioxide, water, and nitrogen.

SUMMARY OF THE INVENTION

The objects described above are accomplished by a method for the purification of waste water by the use of a heat-exchanger type reaction vessel composed of a plurality of inner tubes and a shell defining jointly with the outer peripheries of the inner tubes a passage for the flow of a heat transfer medium, which method comprises passing the waste water through the inner tubes and, at the same time, feeding a molecular oxygen-containing gas to the flow of the waste water thereby establishing contact between the waste water and the feed gas and consequently effecting wet oxidation of the impurities present in the waste water.

The conventional wet oxidation (Zimmermann) method using the single cylinder type reaction column and not involving use of any catalyst has been incapable of effectively treating waste water containing a COD component in a high concentration because it pays no due consideration to relieving the reaction column of the heat of reaction as pointed out previously as the problem confronting this method. In fact, when the waste water subjected to the treatment is in a highly concentrated form, the amount of the heat generated by the reaction is so large that the temperature of the liquid phase with in the reaction column is elevated conspicuously and the water therein is suffered to pass wholly into the vapor phase and the reaction can no longer be continued. Further, the reaction of this wet oxidation by nature suffers the reaction rate to increase in proportion as the reaction temperature is elevated. When the elevation of the reaction temperature is large, therefore, the reaction itself is accelerated possibly so much as to reader the control of the reaction difficult.

We have continued a diligent study to find that the use of a heat-exchanger type reaction vessel as a reactor configured to ensure thorough removal of the heat of reaction is highly effective in the treatment of waste water.

This heat-exchanger type reaction vessel itself shares a common type with reaction vessels frequently used in various vapor-phase oxidation reactions. It has not been employed, however, for the wet oxidation method. A reaction system which combine the heat-exchanger type reaction vessel and the single cylinder type reaction vessel has never been adopted for the operation of the wet oxidation method. We have found, however, that the use of the heat-exchanger type reaction vessel as a container for the wet oxidation reaction brings about a notable improvement in the capacity for waste water treatment as described hereinafter.

First, since the use of this heat-exchanger type reaction vessel permits thorough removal of the heat of reaction from the highly concentrated waste water which the conventional single cylinder type reaction vessel has been unable to treat effectively, the treatment of the waste water can be attained by this reaction vessel without application of unduly high pressure. The upper limited of the COD concentration in the waste water subjected to the treatment, therefore, can be increased from the conventional level of 8% up to 20%. Even when the COD content is low and consequently the amount of the heat of reaction is small, the method of this invention obviates the necessity for unduly heightening the reaction pressure in due consideration of the elevation of the liquid temperature. Further, the amount of the heat to be removed from the reaction vessel can be finely controlled as by adjusting the amount of the heat transfer medium being circulated for cooling within the heat-exchanger part of the reaction system in proportion to the COD concentration in the waste water and the amount of the waste water under treatment.

The heat of reaction recovered from within the reaction vessel may be reclaimed in the form of steam by the use of a steam generating boiler through the medium of a heat medium or effectively recovered and used for preheating the waste water awaiting the treatment. This recovery of the heat of reaction, therefore, proves a generous cut in the expense of equipment and that of operation.

In the wet oxidation reaction, the reaction rate is increased by the elevation of temperature and, in the meantime, the pressure for the retention of the liquid phase is inevitably increased. In the conventional reaction vessel, since the temperature at the inlet part is low and the temperature at the outlet part is high because of the generation of heat by the reaction, the adjustment of the pressure for the retention of the liquid phase has been effected at the portion of the reaction vessel assuming the highest temperature. As a result, the temperature is low and the reaction ratio is proportionately low in the former half part of the reaction vessel relative to the magnitude of the pressure so adjusted. It has been ascertained to the inventors that the use of the heat-exchanger type reaction vessel enables the entire reaction vessel to be controlled at a fixed temperature set in advance and allows the reaction to proceed efficiently at a fixed reaction rate throughout the entire interior of the reaction vessel without requiring application of unnecessary excessive pressure.

BRIEF DESCRIPTION OF THE DRAWINGS

FIG. 1 is a flow sheet illustrating one embodiment of this invention,

FIG. 2 is a flow sheet illustrating a conventional method,

EXPLANATION OF THE PREFERRED EMBODIMENT

Figure 3:
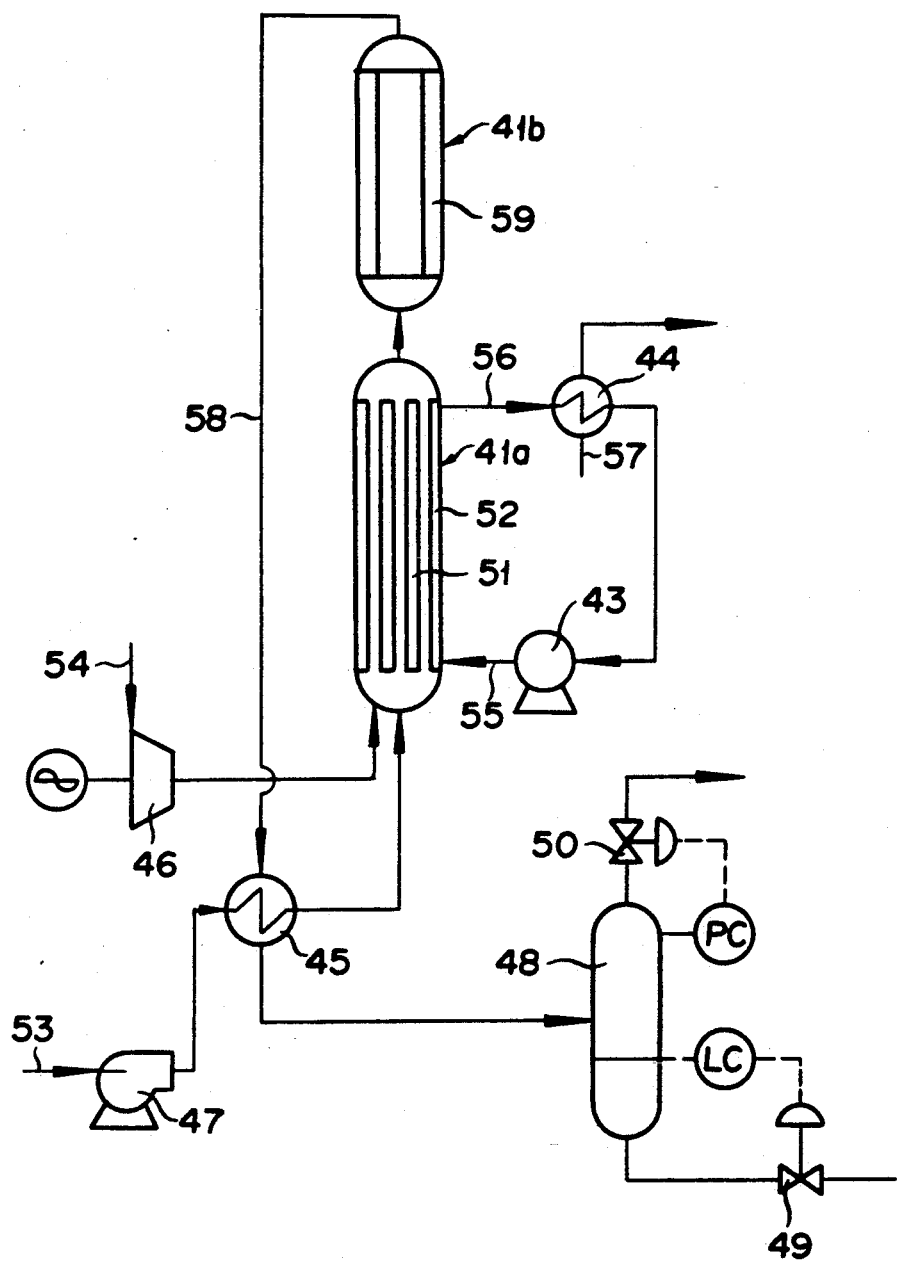
FIG. 3 is a flow sheet illustrating another embodiment of this invention.

The reaction vessel to be used in this invention is a shell-and-tube heat-exchanger type reactor which comprises a shell and a plurality of inner tubes disposed inside the shell and utilizes the empty space defined by the inner surface of the shell and the outer peripheries of the inner tubes as a passage for the flow of a heat transfer medium. The reaction vessel of this type permits simplification of the configuration of reactor, facilitaters design and maintenance of the reactor and, at the same time, allows a decrease in the amount of highly corrosionproof material for use in the reactor parts owing to the passage only through the inner tubes of the waste water possibly containing a corrosive substance, and therefore warrants a reduction in the cost of the reactor.

The heat-exchanger type reaction vessels characterized by the shell-and-tube configuration are broadly divided into the horizontal tube type and the vertical tube type. From the standpoint of the efficiency of vapor-liquid contact, the vertical tube type is believed to be more preferable for this invention. As classified by the bundling pattern of tubes, the heat-exchanger type reaction vessels characterized by the shell-and-tube configuration fall under the three kinds, the stationary tube plate type, the U-shaped tube type, and the loose head type. The method of this invention manifests its effect invariably with the reaction vessel of any one of these kinds. As regards the direction of the flow of the waste water inside the inner tubes and that of the flow of the heat transfer medium on the shell side, the two combinations, i.e. the counterflow and the parallel flow, are conceivable.

The choice between these two combinations forms no critical problem. As the heat transfer medium to be passed on the shell side, any of the conceivable commonly conceivable materials such as water, steam, heat medium quality oil, and molten salt may be used. The circulating rate and the temperature of the heat transfer medium are suitably selected, depending on the COD concentration in the waste water under treatment.

The inner tubes of the reaction vessel to be used in the present invention have an inside diameter in the range of 10 to 100 mm, preferably 15 to 80 mm. If the inside diameter is less than 10 mm, there arises an unfavorable consequence that the reactor grows in structural complexity and the disadvantage due to an increased cost of the reaction vessel more than offsets the advantage due to the removal of the heat of reaction. Conversely, if the inside diameter exceeds 100 mm, the removal of heat from within the inner tubes, particularly in the central part of the inner tube occurs with inferior efficiency, the flow of the molecular oxygen-containing gas fed to the interiors of the inner tubes tends to deflect, and consequently the efficiency of the vapor-liquid contact is degraded possibly to the extent of entailing a decline in the reaction rate. The number of the inner tubes depends on the inside diameter of the inner tubes, the flow volume of the waste water subjected to the treatment, and the like and is required to be plural.

This invention is further characterized by effecting the treatment of waste water which, on being subjected to wet oxidation, exhibits a calorific value exceeding 20 kcal per liter of waste water. The treatment is sufficiently effective even when the calorific value is less than 20 kcal. Where the waste water has a calorific value of less than 20 kcal, however, the necessity for employing the method of this invention loses significance because the demerit due to the increase in the cost of the reaction vessel excels the merit of the removal of heat by the use of the heat-exchanger type reaction vessel. For the purpose of improving the effect due to the temperature control of the reaction vessel and taking and advantage of the merit due to the removal of heat, the waste water subjected to the treatment is preferable to exhibit a calorific value exceeding 50 kcal per liter of waste water. More preferably, this treatment is given to waste water which calorific value exceeds 100 kcal per liter of waste water. In this case, the amount of the heat of reaction to be recovered is to large as to emphasize all the more the advantage of this heat-exchanger type reaction vessel. When the heat exchanger type reactor of the present invention is used, even if a temperature of the waste water to be fed is lower than the reaction temperature, it is heated by the heat transfer medium at the side of the reaction tube inlet and reaches rapidly to the desired temperature. This increases use efficiency and reaction efficiency of the reactor and decreases load of the heat-exchanger for preheating and also decreases cost of the device.

When the calorific value of the waste water exceeds 600 kcal per liter of waste water, the inner tubes of the reaction vessel to be used for the treatment are preferable to possess an inside diameter in the range of 10 to 30 mm. If the inside diameter of the inner tubes exceeds 30 mm where the calorific value is not less than 600 kcal per liter of waste water, since the amount of heat a generated inside the inner tubes is so large relative to the amount of heat removed that the reaction is liable to proceed violently and is continued only with difficulty. For the reaction to be continued smoothly, the reaction vessel is required to have inner tubes 10 to 30 mm in inside diameter.

When the inner tubes of the heat-exchanger type reaction vessel, to be used in this invention are packed with a catalyst, the reaction vessel particularly of this kind exhibits an outstanding performance in the removal of the heat of reaction locally generated in consequence of the improvement in the reaction rate brought about by the catalyst. The use of the catalyst in this manner promises a change for the better such as compaction of the reaction vessel.

The catalyst which are usable for this purpose include those which are obtained by having such metals as manganese, iron, cobalt, nickel, tungsten, copper, cerium, silver, gold, platinum, palladium, rhodium, ruthenium, and iridium or the compounds thereof insoluble or sparingly soluble in water deposited severally on a carrier of alumina, activated carbon, silica-alumina, zirconia, titania, diatomaceous earth, silica-titania, silica-zirconia, titania-zirconia, for example. The catalyst to be used herein is in the form of pellets, beads, or honeycombs.

The wet oxidation contemplated by this invention is preferable to be carried out at a temperature in the range of 120° to 370° C. under a pressure high enough for the waste water under treatment to remain in its liquid state. For the retention of the liquid phase this temperature range must be observed because the critical temperature of water is 370° C. Further, for the purpose of curbing the precipitation of inorganic substances in the waste water, it is necessary to set the pressure at a level high enough for the waste water to remain in the liquid state and resist transformation into vapor. The method of this invention prefers the shell-and-tube heat-exchanger type reaction vessel used therefor to be provided with a gas device having as feed nozzles fitted one each into the lower parts of the inner tubes. These gas feed nozzles are desired each to have a pressure loss of not less than 0.05 kg/cm$^2$. The term "pressure loss" as used herein refers to the difference of pressure which occurs in the current of feed gas between the gas feed manifold ramifying into individual gas feed nozzles and the nozzle outlet.

When the shell-and-tube heat-exchanger type reaction vessel mentioned above is used, it is important that the waste water and the molecular oxygen-containing gas should be fed each in an equal volume to the reaction (inner) tubes. Most conventional methods fail to satisfy this requirement because they require both the waste water and the molecular oxygen-containing gas to be fed through only one feed inlet and, as the result, they entail the phenomenon of deflection of flow and, as a while, suffers from a decline in the efficiency of treatment. Also in the system using a catalyst aimed at heightening the efficiency of the treatment, the pressure loss during the course of packing the individual reaction tubes with the catalyst must be controlled within a very exacting range for the purpose of enabling the waste water and the molecular oxygen-containing gas to be fed each in an equal volume to the reaction tubes. If this requirement is not fully satisfied, there arises a disadvantage that the flow inside the reaction vessel is deflected and the efficiency of treatment is greatly lowered. The molecular oxygen-containing gases which are usable herein include air, pure oxygen, and oxygen-enriched air, for example.

In accordance with the present invention, the shell-and-tube heat-exchanger type reaction vessel is enabled to feed the oxygen-containing gas in an equal volume to the reaction tubes by having gas feed nozzles fitted one each into the lower parts of the reaction tubes. As the result, the waste water is enabled to be fed in an equal volume into the reaction tubes as entrained by the gas issuing form the gas feed nozzles. For the gas to be fed in an equal volume from the gas feed nozzles to the respective reaction tubes, the pressure loss in each of the nozzles is required to be not less than 0.05 kg/cm$^2$, preferably to be in the range of 0.05 to 2 kg/cm$^2$, and more preferably in the range of 0.1 to 1 kg/cm$^2$. The reason for this particular lower limit, 0.05 kg/cm$^2$, is that if the pressure loss is less than 0.05 kg/cm$^2$, the flow volumes of gas fed out of the nozzles are differentiated so much that the flow within the reaction vessel is heavily deflected and, as a result, a supply of the gas in an equal volume to the reaction tubes becomes difficult to attain.

In the present invention, the difference between the pressure losses in the plurality of nozzles used in the gas feed device is required to be within 40%, preferably within 25%. If the difference between the pressure losses in the nozzles exceeds 40%, it become difficult to feed the gas in an equal amount to the reaction tubes and, as the result, the waste water is not retained in an equal volume by the gas. Thus, the flow of the gas and that of the waste water both are liable to entail the phenomenon of deflection and the efficiency of treatment is consequently degraded.

The nozzles in the gas feed device of this invention are only required to be so shaped as to impart the specific pressure difference to the flow of the gas. The supply of the gas to the nozzles of the gas feed device may be attained by the use of radially laid pipes, annular pipes, or small air reservoir drums.

This invention manifests its outstanding effect to still better advantage by effecting the wet oxidation using the shell-and-tube heat-exchanger type reaction vessel in the first stage and the single cylinder type reaction vessel in the second stage. The conception of this configuration is based on our new knowledge that the wet oxidation reaction of this invention is such that the greater part of this reaction occurs in the part approximating the inlet to the reaction vessel and the generation of the heat of reaction is also concentrated in this part.

Since the shell-and-tube heat-exchanger type reaction vessel to be used in the first stage of the wet oxidation reaction has been already described, the single cylinder type reaction vessel to be used in the second stage of the reaction will be described hereinafter.

As the single cylinder type reaction vessel for the second stage, and insulated reaction vessel is used. The reaction vessels of this type are roughly divided into the horizontal tube type and the vertical tube type. From the standpoint of the efficiency of vapor-liquid contact, this invention prefers the reaction vessel to be of the vertical tube type. The reaction tubes are preferable to have an inside diameter in the range of 50 to 2,500 mm, preferably 150 to 1,500 mm, and a length in the range of 1 to 20 m, preferably 1 to 10 m. The inside diameter and the length depend on the residual COD concentration of the waste water at the outlet of the reaction vessel in the first stage, for example.

Similarly to the reaction vessel in the first stage, the reaction vessel in the second stage is allowed to use a catalyst. The amount of this catalyst can be freely selected, depending on the concentration of the waste water, for example. The packing of the catalyst improves the reaction rate and permits compaction of the reaction vessel. Further, in the second stage of the reaction, the heat of reaction posses no problem because the residual calorific value of the waste water is small.

Though the waste water at the inlet to the second stage has a small calorific value, the waste water with the progress of the decomposition comes to allow persistance of sparingly decomposable substances and accumulation of the product of decomposition and requires much time for decomposition. Preferably, therefore, the reaction vessel in the second stage is provided in the inlet part thereof with a nozzle for introduction of air and consequently enabled to introduce air therein and enhance the efficiency of contact between the waste water and the air and expedite the reaction. Since the reaction vessel of the second stage is not of the heat-exchanger type and in consideration of the generation of heat by the reaction, the calorific value of the waste water at the outlet of the reaction vessel in the first stage is preferable to be less than 20 kcal per liter of waste water.

Now, the present invention will be described more specifically below with reference to working examples. It should be noted, however, that this invention is not limited to these examples.

Example 1

FIG. 1 is a schematic diagram of an apparatus for working the method of this invention for the purification of waste water. A reactor 1 used herein had 10 reaction tubes (inner tubes) 11 measuring 50 mm in inside diameter and 6 m in length disposed in a shell 12. The reaction tubes 11 were filled with catalyst pellets (0.5% by weight of Pt supported on titania-zirconia carrier) 5 mm in average diameter, each to form a catalyst layer 5 m in length. A distribution plate for air (not shown) is provided under the reaction tubes.

First, waste water having a COD (Cr) concentration of 120 g/liter and a calorific value of 400 kcal per liter of waste water brought in through a line 13 was impelled by a waste water feed pump 7 to be preheated in a heat-exchanger 5 and then fed to the reactor 1. In the meantime, the air supplied through a line 14 was given increased pressure by a compressor 6 and then fed into the reaction tubes 11 of the reactor 1. A heat transfer medium impelled by a circulation pump 3 through a line 15 to the outside of the inner tubes inside the reactor 1 to remove the heat of reaction generated during the course of reaction. Then, the heat transfer medium which had fulfilled the part of removing the heat was discharged through a line 16 and cooled in a heat-exchanger 4 with the cooling water brought in through a line 17. The heat deprived of the hot heat transfer medium was recovered consequently. The waste water which had been treated in the reactor 1 was discharged through a line 18, cooled in the heat-exchanger 5, and then fed to a gas-liquid separator 8. There to be separated into a harmless gas and water. In this gas-liquid separator 8, a liquid level controller LC detects the liquid level and actuates a liquid level control valve 9 to keep the liquid level constant and, at the same time, a pressure controller PC detects the pressure and actuates a pressure control valve 10 to keep the pressure constant.

In this case, the reaction in the reactor 1 was carried out at a reaction temperature of 250° under a reaction pressure of 75 kg/cm$^2$. G, with the flow volume of the waste water through each of the reaction tubes fixed at 15 liter/hr and the flow volume of the air at 7,200 N. liter/hr (the total volume of the waste water at 150 liters/hr and that of the air at 72 Nm$^3$/hr throughout the entire reactor). In this treatment, the maximum temperature within the catalyst bed was 267° C. and the conversion of COD was 99.4%.

Control 1

FIG. 2 is a schematic diagram of an apparatus using a single cylinder type reactor. A reactor 21 used herein measured 50 mm in inside diameter and 6 m in length. It was filled with catalyst pellets (0.5% by weight of Pt supported on titania-zirconia carrier) 5 mm in average particle diameter to form a catalyst bed 5 m in length. The single cylinder of the reactor was covered with an insulating material 39.

The air given increased pressure by a compressor 26 introduced waste water into the cylinder of the single cylinder type reactor 21 packed with the catalyst and not vested with a function for the removal of heat, there to establish contact and induce reaction between the air and the waste water. Then, the resultant mixture was passed through a heat-exchanger 25 and led to a gas-liquid separator 28, there to be separated into a harmless gas and water. At this time, the catalyst bed was tested for temperature distribution. The conditions such as of the catalyst and the treatment used herein were the same as those of Example 1. In the treatment, the maximum temperature in the catalyst layer reached 400° C. and the reaction could not be continued.

In FIG. 2, the reference numerals which are the sum of the reference numerals used to denote component parts in FIG. 2 severally plus 20 denote the identical component parts shown in FIG. 1.

Examples 2 to 7

In a similar reactors to Example 1 vested with a function for exchange of heat and provided with reaction tubes of varying diameters, waste water of varying concentration was treated under varying conditions. The reaction conditions, the maximum temperature of catalyst bed, and the conversion of COD involved in each of the experiments were as shown in Table 1. The volume of waste water and that of air indicated in this table were each the value per reaction tube.

level and actuated a liquid level control valve 49 to keep the liquid level constant and, at the same time, a pressure controller PC detected the pressure and actuated a pressure control valve 50 to keep the pressure constant. In this treatment, the reaction temperature in the first reactor 41a was 250° C. and that in the second reactor 41b was 255° C. and the pressure was 75 kg/cm$^2$.G. The flow volume of the waste water per reaction tube was 15 liters/hr and that of the air 7,200 N liter/hr (the total volume of the waste water was 150 liters/hr and that of the air 70 N m$^3$/hr through out the entire reactor). As the result, the maximum temperature in the catalyst layer of the first reactor 41a was 266° C., and that of the

TABLE 1

| Example | Inside diameter of inner tube (mm) | Length of catalyst layer (m) | COD concentration in waste water (g/liter) | Calorific value per liter of waste water (kcal/liter) | Reaction temperature (°C.) | Reaction pressure (kg/cm$^2$ · G) | Volume of air per reaction tube (N lit./hr) | volume of waste water per reaction tube (lit./hr) | Maximum temperature of catalyst layer (°C.) | Conversion of COD (%) |
|---|---|---|---|---|---|---|---|---|---|---|
| 2 | 80 | 5 | 80 | 270 | 250 | 75 | 11,200 | 35 | 265 | 99.5 |
| 3 | 50 | 5 | 80 | 270 | 250 | 75 | 4,800 | 15 | 260 | 99.2 |
| 4 | 50 | 5 | 150 | 500 | 230 | 75 | 9,000 | 15 | 258 | 91.0 |
| 5 | 25 | 5 | 200 | 670 | 230 | 75 | 2,800 | 3.5 | 252 | 93.0 |
| 6 | 80 | 5 | 24 | 80 | 250 | 60 | 3,360 | 35 | 254 | 90.5 |
| 7 | 80 | 5 | 9 | 30 | 250 | 60 | 1,260 | 35 | 253 | 89.0 |

Example 8

FIG. 3 is a schematic diagram illustrating another apparatus for working the method of this invention. This apparatus uses a shell-and-tube heat-exchanger type reactor in the first stage and a single cylinder type reactor in the second stage. A first heat-exchanger type reactor 41a and 10 reaction tubes (inner tubes) 51 measuring 50 mm in inside diameter and 4 m in length disposed in a shell 52. The reaction tubes 51 were packed with catalyst pellets (0.5% by weight of Pt supported on titania-zirconia carrier) 5 mm in average diameter, each to form a catalyst layer 3 m in length. A second single cylinder 41b measured 250 mm in inside diameter and 2 m in length. It was filled with catalyst pellets (0.5% by weight of Pt supported on titania-zirconia carrier) 5 mm in average particle diameter, to form a catalyst layer 1.2 m in length. The single cylinder was covered with an insulating material 59.

First, waste water having a COD (Cr) concentration of 120 g/liter and a calorific value of 400 kcal per liter of waste water and brought in through a line 53 was impelled by a waste water feed pump 47 to be preheated in a heatexchanger 45 and then fed to the first reactor 41a. In the meantime, the air brought in through a line 54 was given increased pressure by a compressor 46 and fed into the reaction tubes 51 of the first reactor 41a. In the meantime, a heat transfer medium was forwarded by a circulation pump 43 through a line 55 to the outside of the inner tubes of the reactor 41a to effect removal of the heat of reaction. Then, the heat transfer medium used for the removal of heat was discharged through a line 56 and cooled in a heat-exchanger 44 with the cooling water fed through a line 57. Thus, the cooling of the hot heat transfer medium and the recovery of the heat of reaction were attained. The waste water treated in the first reactor 41a was then fed to the second reactor 41b to be treated therein. It was discharged through a waste water line 58, cooled in a heat-exchanger 45, and then fed to a gas-liquid separator 48 there to be separated into a harmless gas and water. In the gas-liquid separator 48, a liquid level controller detects the liquid second reactor 41b was 255° C. The conversion of COD was 96% at the output part of the first reactor and 99.5% at the outlet of the second reactor.

Example 9

Figure 4:
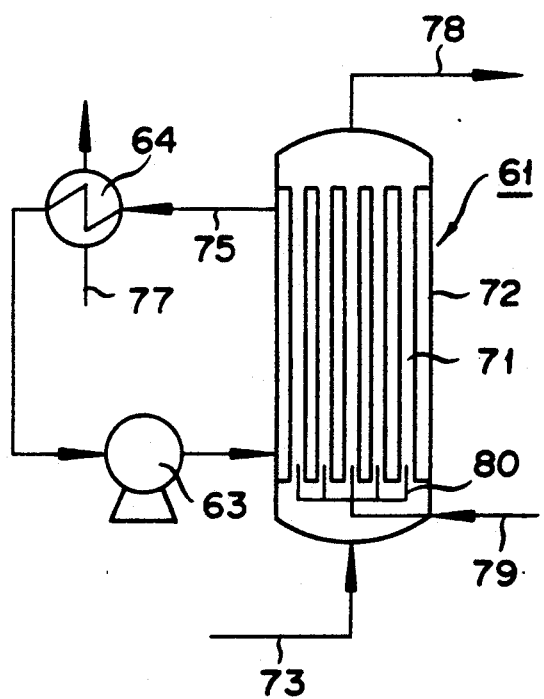
FIG. 4 is a flow sheet illustrating yet another embodiment of this invention.

A shell-and-tube heat-exchanger 61 had 10 reaction tubes 71 measuring 50 mm in inside diameter and 5 m in length disposed in a shell 72 a illustrated in FIG. 4. The reaction tubes 71 were filled with catalyst pellets (0.5% by weight of Pd supported on titania-zirconia carrier)5 mm in average particle diameter, each to form a catalyst layer 4 m in length. To this reactor 61, waste water having a COD (Cr) concentration of 100 g/lit. and a calorific value of 340 kcal per liter of waste water was fed through a line 73 in a flow volume of 16 liters/hr per reaction tube. In the meantime, the air was brought in through a line 79 and fed through nozzles 80 at a flow volume of 6,400 N liter/hr per reaction tube. The reaction temperature was 250° C. and reaction pressure was 75 kg/cm$^2$.G. To the outside of the reaction tubes 71 of the reactor 61, a heat transfer medium was supplied by a circulation pump 63 to be used for cooling the reactor. The heat transfer medium thus used was discharged through a line 75 and, in a heat-exchanger 64, a lowed to exchange heat with the cooling water fed through a line 77. Thus, the recovery of the heat of reaction was attained. The gas feed nozzles 80 used herein had a pressure loss of 0.15 kg/cm$^2$ and a difference of pressure of 18% between the nozzles. In this reaction, the conversion of COD was 99.1%.

Examples 10 to 13

Purification of waste water was performed by repeating the procedure of Example 9, except that the conditions of the nozzles 80 in the gas feed device were varied. The treated waste water samples were tested for conversion of COD. The results were as shown in Table 2.

Examples 14 to 18

Purification of waste water was performed by repeating the procedure of Example 9, except that the conditions of the nozzles 80 in the gas feed device, concentration of the waste water, the size of the reaction tube and packing catalyst were varied. The treated waste water samples were tested for conversion of COD. The results were as shown in Table 2.

TABLE 2

| Ex. | Inside diameter of inner tube (mm) | Length of catalyst layer (m) | COD concentration in waste water (g/liter) | Calorific value per liter of waste water (kal/liter) | Reaction temperature (°C.) | Reaction pressure (kg/cm² · G) | Volume of air per reaction tube (N lit./hr) | volume of waste water per reaction tube (lit./hr) |
|---|---|---|---|---|---|---|---|---|
| 10 | 50 | 4 | 100 | 340 | 250 | 75 | 6,400 | 16 |
| 11 | 50 | 4 | 100 | 340 | 250 | 75 | 6,400 | 16 |
| 12 | 50 | 4 | 100 | 340 | 250 | 75 | 6,400 | 16 |
| 13 | 50 | 4 | 100 | 340 | 250 | 75 | 6,400 | 16 |
| 14 | 80 | 5 | 80 | 270 | 240 | 75 | 11,200 | 35 |
| 15 | 80 | 5 | 80 | 270 | 240 | 75 | 11,200 | 35 |
| 16 | 25 | 5 | 200 | 670 | 220 | 75 | 2,800 | 3.5 |
| 17 | 25 | 5 | 200 | 670 | 220 | 75 | 2,800 | 3.5 |
| 18 | 25 | 5 | 200 | 670 | 220 | 75 | 2,800 | 3.5 |

| Ex. | Pressure loss of each nozzle (kg/cm²) | Difference of pressure loss between nozzles (%) | Conversion of COD (%) | Packing catalyst |
|---|---|---|---|---|
| 10 | 0.5 | 5 | 99.4 | Pd 0.5 wt. % supported on $TiO_2$—$ZrO_2$ carrier |
| 11 | 0.2 | 15 | 99.2 | Pd 0.5 wt. % supported on $TiO_2$—$ZrO_2$ carrier |
| 12 | 0.1 | 20 | 99.0 | Pd 0.5 wt. % supported on $TiO_2$—$ZrO_2$ carrier |
| 13 | 0.05 | 30 | 96.0 | Pd 0.5 wt. % supported on $TiO_2$—$ZrO_2$ carrier |
| 14 | 1 | 5 | 99.6 | Pd 0.5 wt. % supported on $TiO_2$—$ZrO_2$ carrier |
| 15 | 0.5 | 10 | 99.5 | Pd 0.5 wt. % supported on $TiO_2$—$ZrO_2$ carrier |
| 16 | 0.2 | 20 | 96.5 | Pd 0.5 wt. % supported on $TiO_2$—$ZrO_2$ carrier |
| 17 | 0.1 | 30 | 95.5 | Pd 0.5 wt. % supported on $TiO_2$—$ZrO_2$ carrier |
| 18 | 0.05 | 40 | 94.0 | Pd 0.5 wt. % supported on $TiO_2$—$ZrO_2$ carrier |

What is claimed is:

1. A method for purifying waste water comprising, (1) providing a heat-exchanger type reaction vessel having a shell and plurality of tubes with outer peripheries, said shell defining jointly with the outer peripheries of the tubes a passage for the flow of a heat transfer medium around the outer peripheries of said tubes, (2) passing said waste water through said tubes and, at the same time, (3) feeding molecular oxygen-containing gas to the flow of said waste water thereby establishing contact between said waste water and said molecular oxygen-containing gas to effect wet oxidation of impurities present in said waste water, said wet oxidation being carried out in the presence of a catalyst for oxidation of said impurities, and passing said heat transfer medium through said passage, said heat transfer medium being in contact with said outer peripheries of said tubes and not in contact with said waste water.

2. A method according to claim 1, wherein said tubes have an inside diameter in the range of 10 to 100 mm.

3. A method according to claim 1, wherein said waste water during said wet oxidation exhibits a calorific value of at least 20 kcal per liter of waste water.

4. A method according to claim 3, wherein said reaction vessel is used for the treatment of waste water possessing a calorific value exceeding 600 kcal per liter of waste water, and said reaction vessel is provided with tubes having an inside diameter in the range of 10 to 33 mm.

5. A method according to claim 1, wherein said wet oxidation is carried out at a temperature in the range of 120° to 370° C. under a pressure high enough for said waste water to remain in the liquid phase.

6. A method according to claim 1, wherein said molecular oxygen-containing gas is air.

7. A method according to claim 1, wherein said heat-exchanger type reactor is provided with a gas feed device having as feed nozzles fitted one each in the lower parts of said tubes under the conditions such that the pressure loss of each of said nozzles is not less then 0.05 kg/cm₂.

8. A method according to claim 7, wherein the difference between the pressure losses of the nozzles is within 40%.

9. A method according to claim 1 wherein said wet oxidation is carried out first in a shell-and-tube heat-exchanger type reactor and then in a single cylinder type reactor not vested with a function for exchange of heat.

10. A method according to claim 9, wherein said waste water fed to said shell-and-tube heat-exchanger type reactor exhibits, during the course of said wet oxidation, a calorific value of at least 20 kcal per liter of waste water.

11. A method according to claim 10, wherein said waste water exhibits, at the outlet of said shell-and-tube heat-exchanger type reactor, a calcrific value of less than 20 kcal per liter of waste water.

12. A method, according to claim 1, wherein said heat transfer medium is selected from the group consisting of oil, molten salt, water and steam.

* * * * *